June 1, 1943.                N. BARTLETT                2,320,555
                          AMUSEMENT APPARATUS
                          Filed Jan. 22, 1941            5 Sheets-Sheet 1
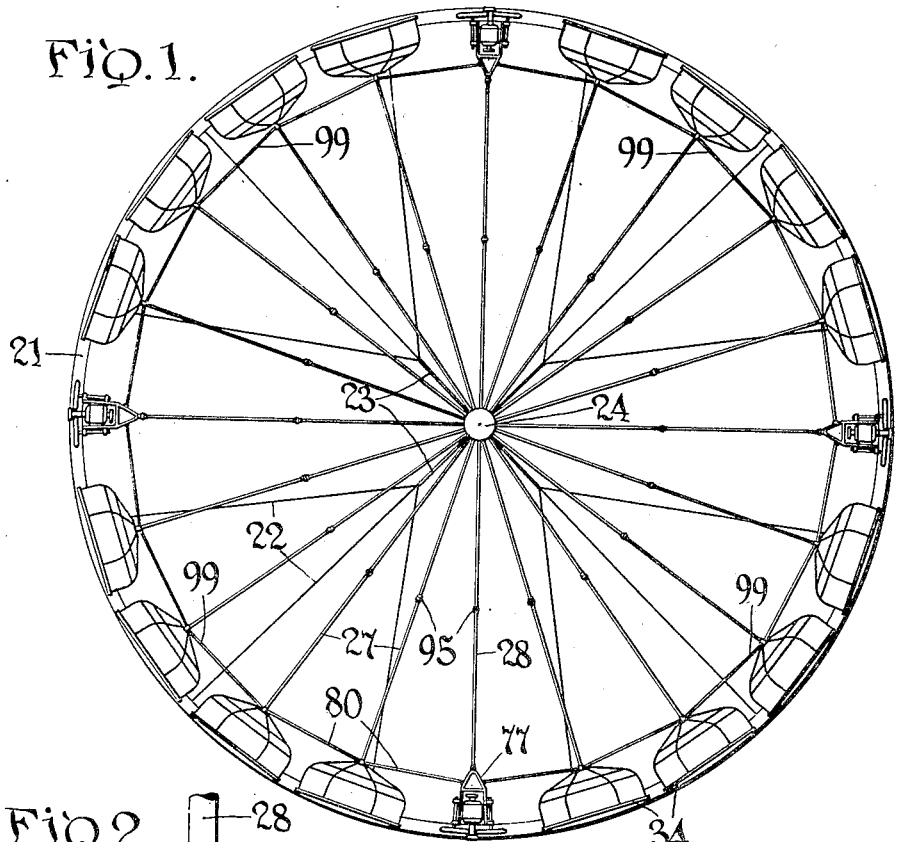
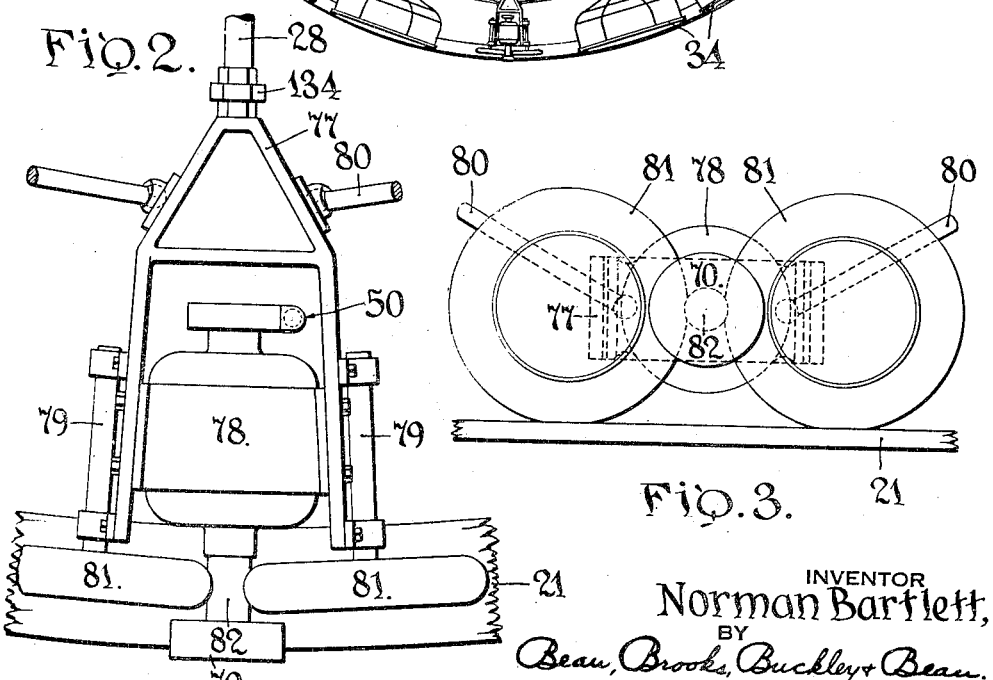
INVENTOR
Norman Bartlett,
BY
Beau, Brooks, Buckley & Beau.
ATTORNEYS

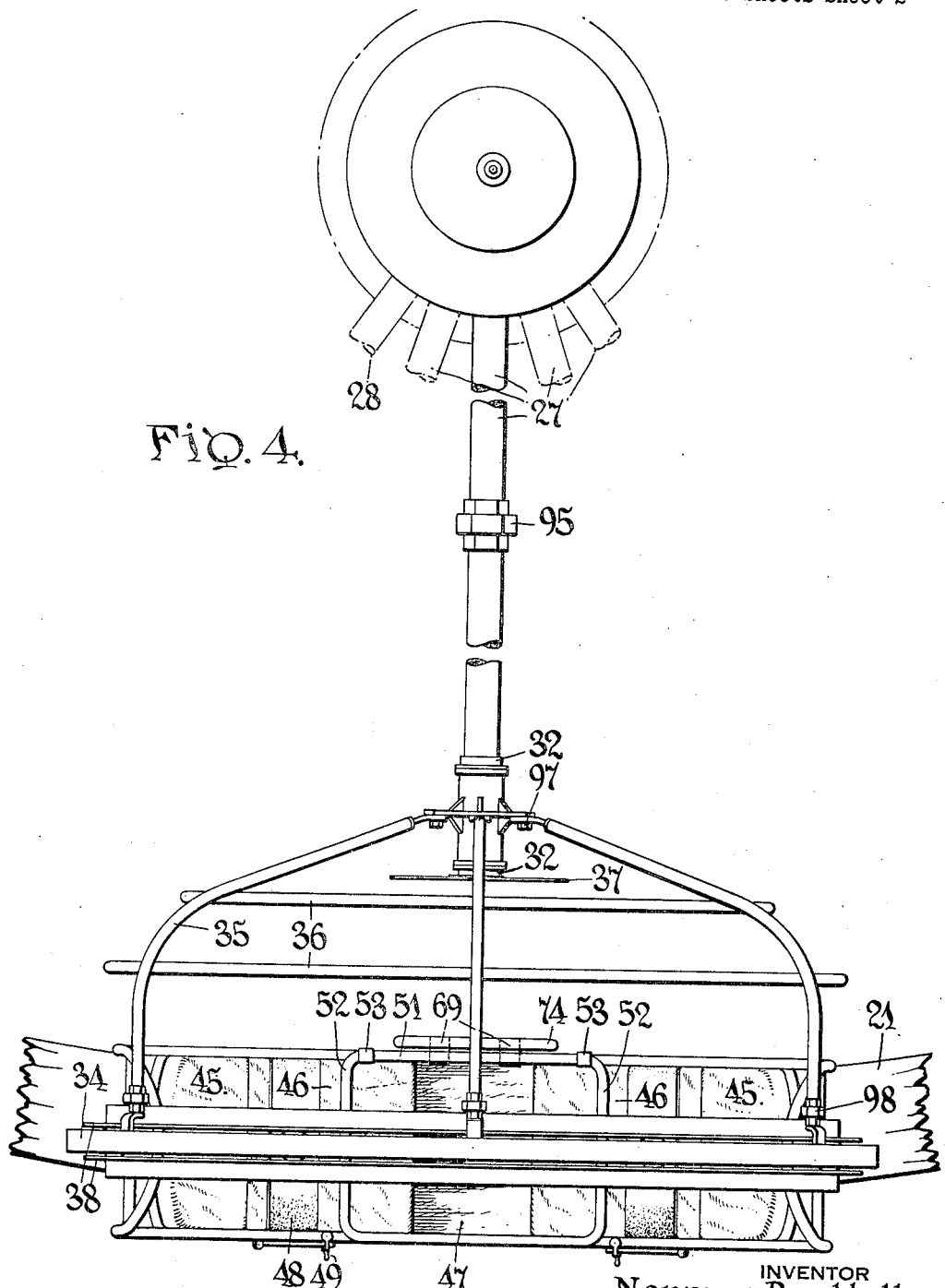

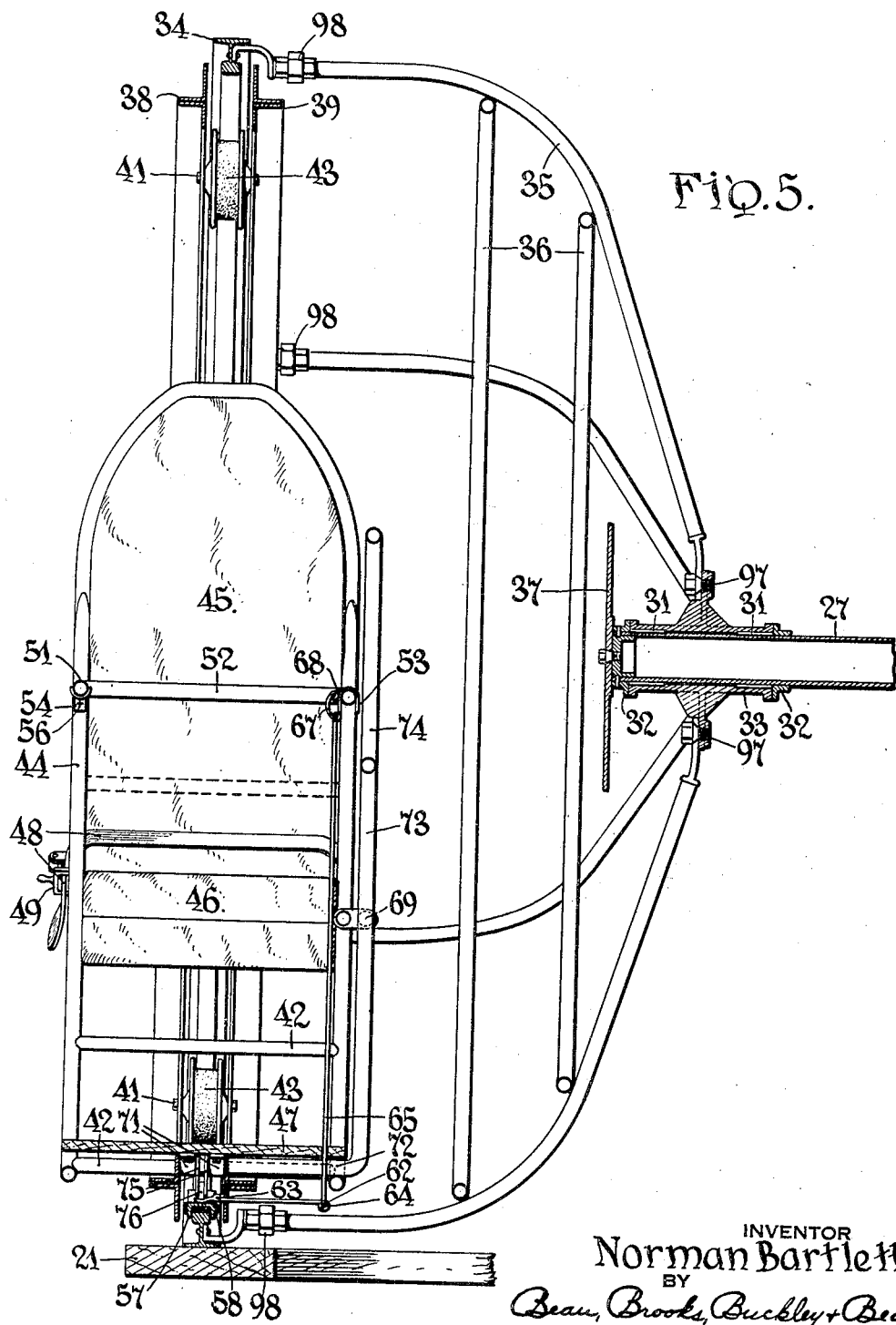

June 1, 1943.                N. BARTLETT                 2,320,555
                          AMUSEMENT APPARATUS
                          Filed Jan. 22, 1941              5 Sheets-Sheet 4
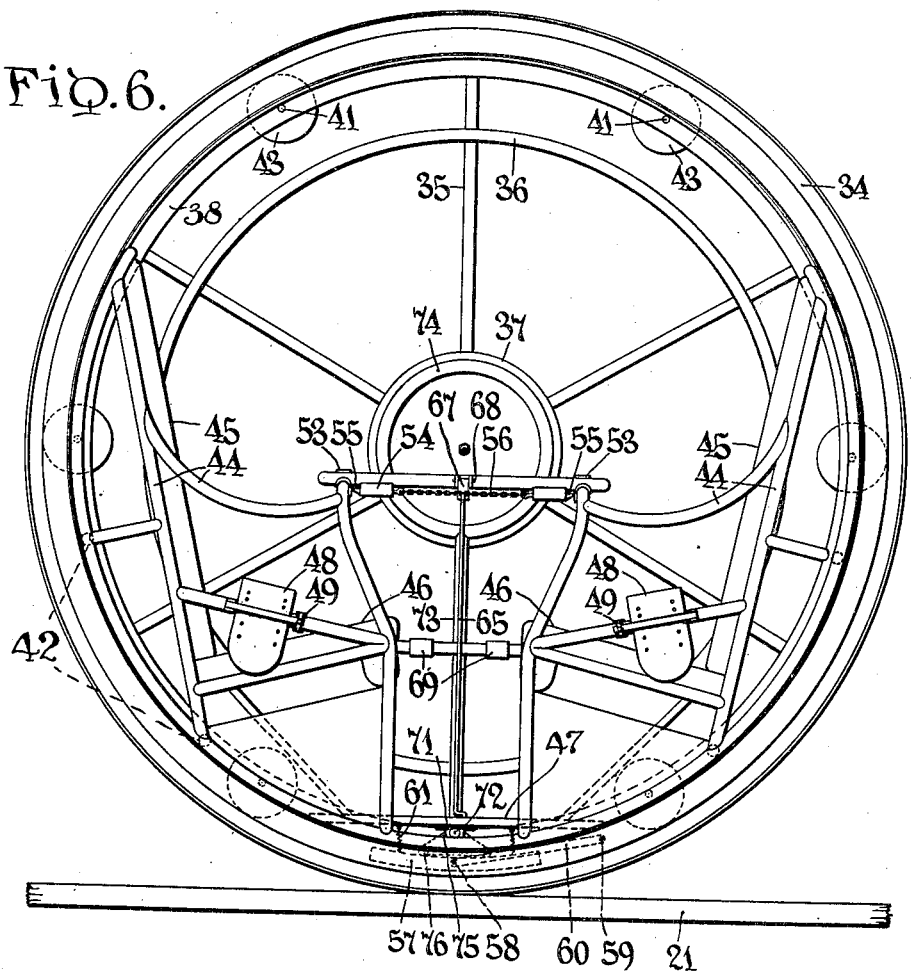
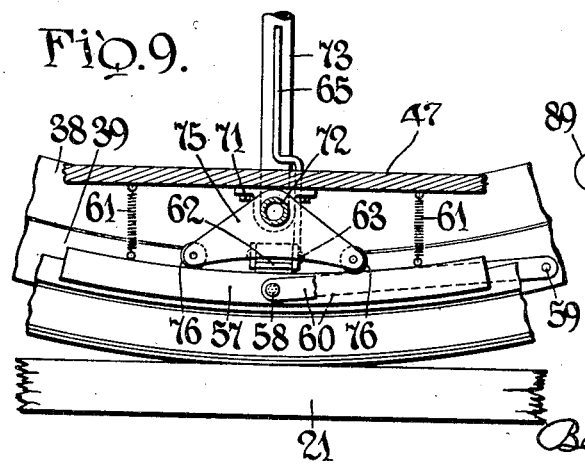
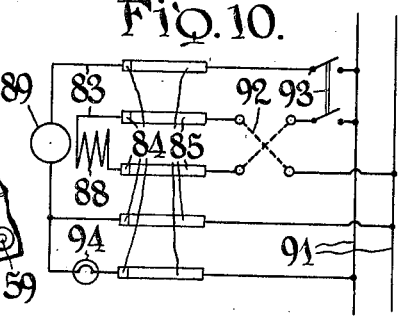
INVENTOR
Norman Bartlett,
BY
Beau, Brooks, Buckley + Beau.
ATTORNEYS

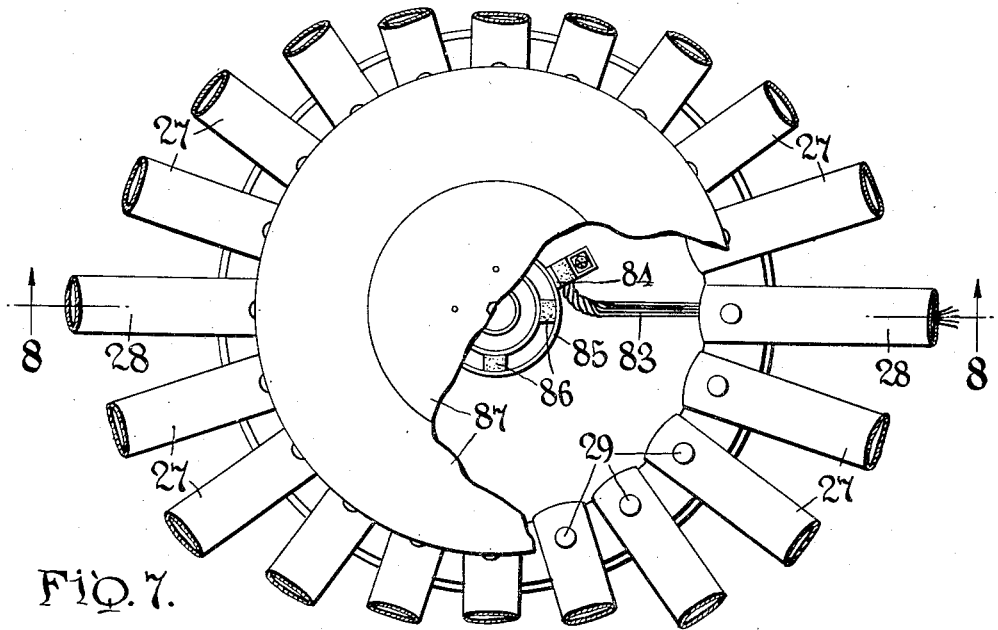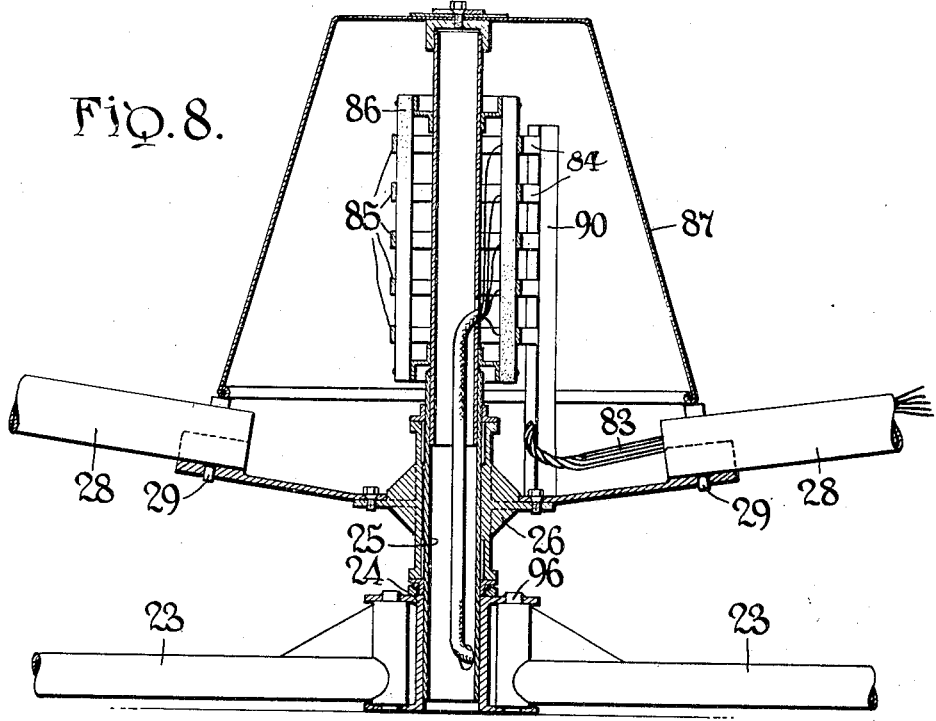

Patented June 1, 1943

2,320,555

UNITED STATES PATENT OFFICE 2,320,555

AMUSEMENT APPARATUS

Norman Bartlett, North Tonawanda, N. Y., assignor of one-half to Marjorie Bartlett, North Tonowanda, N. Y.

Application January 22, 1941, Serial No. 375,478

8 Claims. (Cl. 272—36)

The present invention relates to amusement apparatus and has particular relation to apparatus wherein one or more passenger carriages are adapted to be rotated about a substantially horizontal axis, the passengers in the carriages receiving a ride simulating that obtained in an airplane which is looped.

In one form of the invention each passenger carriage is mounted for rotation within a substantially upright wheel that has rolling contact with a substantially flat circular track. Means are provided for driving the wheel about the track and means are also provided for at times clutching the carriage to the wheel, so that the carriage, which gravity will normally maintain in an upright position, will tend to roll with the wheel.

The clutch means are designed to slip under excessive load and are operable, preferably by a passenger in the carriage, to enable alternate engagement and disengagement whereby the carriage may be caused to oscillate about its axis of rotation with the wheel, the amplitude of oscillation increasing until sufficient momentum is attained to enable the carriage to roll as a unit with the wheel, without excessive load being imposed upon the driving means. Safety means for retaining passengers in the carriage may be so associated with the clutch means that when moved to retracted position to allow passengers to leave or enter, the clutch will be engaged automatically, thereby serving as a brake to hold the carriage against unwanted movement.

These and other objects and advantages will become apparent from the following description of the typical embodiments of the invention shown in the accompanying drawings, wherein:

Fig. 1 is a plan view of the amusement apparatus;

Fig. 2 is a plan view of the drive or traction mechanism shown in Fig. 1;

Fig. 3 is a side elevation of the mechanism shown in Fig. 2;

Fig. 4 is a plan view showing the central portion of the mechanism and one of the passenger carriages appearing in Fig. 1;

Fig. 5 is a front elevation of the passenger carriage portion of the apparatus;

Fig. 6 is a side elevation of the structure shown in Fig. 5;

Fig. 7 is a plan view of the central portion of the apparatus with parts broken away;

Fig. 8 is a vertical section taken approximately along line 8—8 of Fig. 7;

Fig. 9 is a fragmentary vertical sectional view showing the clutch mechanism in side elevation; and Fig. 10 is a wiring diagram.

As shown in the drawings the apparatus includes a substantially flat circular track 21 supported upon the ground or a suitable foundation, and braced by guy wires 22 anchored to legs 23 radiating from a centrally disposed support 24. Extending upwardly from the latter is an upright tubular post 25 upon which is mounted for rotation a framework comprising a hub member 26 and radially extending tubular arms 27 and 28, these arms preferably being detachably secured to the hub member by pins 29.

Mounted for rotation on rollers 31 around outer end portion of each tubular arm 27, and confined between collars 32 secured to the arm, is the hub 33 of a carriage wheel having a rim 34 of rail-cross-section, whose flange portion bears with rolling contact upon the track 21, and having spokes 35 connecting the rim to the hub and braced by tubular rings 36. A plate 37 may be secured over the end of each arm 27 to conceal the hub structure 33, and, if desired, to bear printed instructions or other information to passengers in the carriages that are now to be described.

Concentric with the rim 34 of each carriage wheel are rims 38 and 39 of a carriage frame, each rim comprising inner and outer members of angular cross-section with abutting flanges, and the rims 38 and 39 being connected by shafts 41 and also by transverse carriage frame members 42. Mounted for rotation on shafts 41 are flanged and rubber-tired wheels 43 having rolling engagement with rim 34 and supporting the carriage for rotation concentrically of the carriage wheel about the substantially horizontal axis of rotation or axis of hub 33.

Each carriage may further include a pair of facing chairs, each chair comprising a frame 44, a back 45 and a seat 46. Between the chairs, at the feet thereof, is a floor board 47 suitably secured to the carriage framework. Extending across each chair, above the seat thereof, is a safety belt 48 permanently secured to one arm of the chair and provided at its opposite end with a releasable catch 49 for connecting it to the other arm of the chair. The belts, which may be similar to those used on airplanes, are designed to extend over the laps of passengers in the carriage, to retain them seated even when the carriage is inverted.

For further insuring retention of passengers in each carriage there is provided a tubular frame 51 (see Figs. 4 and 5) each end 52 of which constitutes a safety bar in front of each passenger and which may be grasped by the passenger. The frame is pivoted to the framework of the passenger carriage by extending through inverted U-shaped straps 53 secured to the framework. Attached to the front portion of the frame 51 are members 54 slidably supporting spring pressed latches 55 engaging suitable catches carried by the framework 44. The latch members, which engage their catches when the safety bar member is in the lowered position shown in the drawings, may be released by a person attending to the entry and discharge of passengers by pulling on a chain 56 which is extended between and connects the two latch members. When so released the member 51 may be swung upwardly about its pivot at 53 into a position slightly beyond upright position, thereby clearing the way for passengers to enter or leave the carriage.

A clutch or brake shoe 57, provided with suitable facing material for engagement with rim 34, is pivoted at 58 to a pair of parallel links 60 which are also pivoted at 59 to the carriage rims 38, 39. Springs 61 connect the shoe with the latter rims and normally serve to retain the shoe out of contact with the wheel rim 34. A lever 62 pivoted at 63 to the carriage structure has one end bearing upon the central portion of the shoe 57 and its opposite end pivoted at 64 to a rod 65. The upper end of the latter is connected by a curved pivot link 67 to a projection 68 from the safety bar member 51.

By this arrangement, when the safety bar is swung upwardly about its pivotal connection 53, the rod 65 will be raised, and the lever 62 moved about its fulcrum 63 to press the shoe 57 into engagement with the rim 34. In this manner, assuming the rim 34 to be stationary, the carriage will be held against movement while passengers are entering or leaving. The curvature of pivoted link 67 is such that when it bears against member 51 when the latter is swung upwardly about its pivot (the link limiting such motion), a line extended between the two pivots of the link, and also pivot 64, would be slightly to the right of the pivot of member 51, as the parts appear in Fig. 5. Therefore, since the brake linkage, including lever 62, is somewhat resilient, the linkage will act to hold the member 51 against accidental displacement when it is in raised position.

Journaled in bearings 71 that are secured to floor board 47 is a clutch control shaft 72 having an upward extension 73 terminating in a handle portion 74 within easy reach of a passenger in either of the two seats of the carriage. Secured to the shaft 72 between the bearings 71 are a pair of plates 75 supporting spaced rollers 76. The latter are so related to the shoe 57 that when the shaft 72 is rocked in either direction (by the handle 74) one of the rollers will engage and depress the shoe, tending to move it against the resistance of the springs 61 into engagement with wheel rim 34.

It will be understood that the means just described constitutes a clutch means whereby a passenger in the carriage, by either pushing or pulling on a control member, which in the illustrated embodiment takes the form of the handle 74, may engage the shoe 57 with the rim 34 of the carriage wheel, tending to clutch the carriage and carriage wheel together for movement as a unit.

Secured to the outer end of each frame arm 28 is a traction unit for driving adjacent carriages around the track 21. The traction unit may comprise a frame 77 connected to an arm 28 and supporting an electric motor 78, preferably of the reversible type, and axles 79 upon which are mounted for free rotation rubber-tired traction wheels 81. Secured on the shaft of the motor may be an automatic clutch 70 whose driven element includes a hub 82 which is firmly engaged by and held in compression between the rubber tires of the wheels 81 for rotating the latter. The motor may have an automatic brake 50 to decelerate the motor promptly when its electrical energy is cut off. Traction bars 80 couple the traction unit to adjacent arms 27 of the framework.

The motor may be operated by electric current supplied through wires 83 extending through the tubular arm 28 to brush members 84 carried by a suitably insulated bracket 90 mounted on the frame hub 26, the brushes contacting rings 85 carried by insulators 86 mounted upon an extension of post 25. The ring and brush assembly may be covered by a cylindrical casing 87, removably secured to the post extension, the casing when in place also functioning to prevent displacement of pins 29 which secure the arms 27 and 28 to the hub 26.

Fig. 10 is a wiring diagram showing how the wires 83, brushes 84 and rings 85 may be electrically connected to the field 88 and armature 89 of the motor 78, and to lead wire 91 extending to a suitable source of electrical energy. The diagram also shows a reversing switch 92 in the field circuit whereby the operator of the amusement apparatus may reverse the motor 78, a switch 93 for stopping the motor, and a lighting circuit for one or more electric lamps 94 which may be mounted upon the rotatable framework. While an electric motor has been shown and described herein, it will be understood that any other suitable type of engine, such as a gasoline engine provided with a suitable automatic clutch, may be used.

In operation, with passengers in the carriages, an operator of the apparatus may close the switch 93 causing the traction units to move in one direction around the track 21, pulling or pushing adjacent carriages whose wheels will roll upon the track, the carriages themselves remaining in the upright position shown in Figs. 5 and 6 by action of gravity with the small wheels 43 rolling upon the rim 34 of the large carriage wheels. When a passenger in the carriage now moves the handle 74 the resulting action of clutch member 57 will cause the carriage to tend to move as a unit with the wheel rim 34.

Preferably, however, the clutch action is so relatively light that the carriage will at first engagement only move with the carriage wheel for a part of one revolution, the clutch slipping thereafter under the load of gravity upon the carriage with its occupants. Subsequent alternate disengagement and re-engagement of the clutch in synchronism with movement of the carriage may cause the latter to rock back and forth upon the rolling carriage wheel with increasing amplitude. Finally, the rocking action may become of large amplitude, so that the carriage will have sufficient momentum to rotate as a unit with the carriage wheel, the passenger in one seat moving in a diving head-over-heels path and the passenger in the opposing seat moving in a heels-over-head path.

The clutch action may be limited to insure slippage under a given load, by limiting the possible movement of the clutch operating shaft 72. This may be accomplished by providing stops 69 on the carriage framework, the stops being engageable by the shaft extension 73 to limit the permissible engaging movement of the clutch shoe by an occupant of the carriage.

By reason of the clutch means the passengers are able to control the carriage action to a large extent, adding to the enjoyment and zest of the ride. Further, the load on the motor 78 of the traction unit is small, since the carriage is not so rapidly accelerated as would occur if the clutch action permitted no substantial slippage. It will be understood, however, that with a sufficiently large motor the clutch action may be made positive if desired, in which case upon engagement of the clutch the carriages will almost immediately rotate as a unit with the carriage wheel.

After the passenger carriages have been moved in one direction about the track for a desired period of time, the apparatus may be reversed by means of the switch 92, so that all passengers will experience the ride in both directions.

While in the apparatus illustrated the clutch mechanism is passenger controlled, it will be understood that by suitable means, such as a solenoid on the carriage controlled by the operator from a remote point, such as near the switches 92 and 93, the clutch mechanism may be engaged or disengaged by the operator instead of by the passengers.

The apparatus shown is susceptible of ready modification as to passenger capacity. For example, the apparatus may include only one arm 27 and one carriage, and one arm 28 and traction unit. As desired or needed, other carriages may be added; for example, as in the illustrated embodiment, three more carriages to be driven by a single traction unit. Then as desired, other units each consisting of one traction unit and one or more carriages may be added until the track 21 is filled with carriages and traction units, which is the condition shown in Fig. 1. When such other units are added, bars 99 are preferably interposed between them and adjacent units to maintain the desired distance between the several units.

In the form of the invention herein illustrated and described, the apparatus may be readily knocked down for transport to another location. The arms 27 and 28 may be made in sections which may be detachably connected together and to the traction units by couplings 95 and are removably connected to the hub 26 by pins 29 as previously described, while the legs 23 may be pivoted at 96 to the support 24. The carriage wheel spokes may be readily disassembled from hubs 33 by removal of screws 97 and from the rim 34 by releasing couplings 98.

It will be understood that the invention is susceptible of operation wherein turning moments in opposite directions may be alternately applied to a carriage, so as to cause oscillations of the carriage prior to the time it is rotated continuously in one direction or the other, the two opposed turning moments being applied either by a motor or by, alternately, a motor and gravity. However, it will be appreciated that with power units of sufficient capacity the continuous rotary action may be commenced immediately. In any case, however, when continuous rotation is in progress, centrifugal forces will act on the passengers, holding them firmly in the seats.

It will be understood further that the apparatus shown and described herein is merely exemplary of the inventive principles involved, and that these principles may be otherwise embodied without departing from the spirit of the invention or the scope of the appended claims.

What is claimed is:

1. In amusement apparatus, a circular track, a plurality of wheels adapted to roll around said track, a framework mounted for rotation about an upright axis disposed centrally of the track and including an axle for each wheel, a passenger carriage associated with each wheel for rotation about the axis of rotation of the wheel, friction clutch means associating each wheel and carriage and engageable while the latter are relatively rotating, said clutch means when engaged tending to secure the wheel and carriage for movement as a unit about the axis of rotation of the wheel.

2. In apparatus of the class described, a circular track, a wheel adapted to roll around said track, an arm carrying said wheel and mounted for rotation about an upright axis disposed centrally of said track, a passenger carriage associated with said wheel and mounted for rotation about the axis of rotation of said wheel, means for driving the arm and wheel to cause the latter to roll around the track, friction clutch means associated with said wheel and carriage and engageable while the latter are relatively rotating, said clutch means when engaged tending to secure the wheel and carriage for movement together about the axis of rotation of the wheel, and means for effecting engagement and disengagement of said clutch means.

3. In apparatus of the class described, a circular track, a wheel adapted to roll around said track, an arm carrying said wheel and mounted for rotation about an upright axis disposed centrally of said track, a passenger carriage associated with said wheel and mounted for rotation about the axis of rotation of said wheel, means for driving the arm and wheel to cause the latter to roll around the track, friction clutch means associated with said wheel and carriage, said clutch means when engaged tending to secure the wheel and carriage for movement together about the axis of rotation of the wheel, and means for effecting engagement and disengagement of said clutch means, said last mentioned means including a resilient member for normally holding the clutch disengaged, and control means operable by a passenger in said carriage to engage said clutch means.

4. In apparatus of the class described, inner and outer concentric rings, means supporting the outer ring in a substantially upright plane, rollers on one of said rings having rolling contact on the other one thereof whereby the inner ring may rotate within the outer ring, a passenger carriage supported upon said inner ring, a safety bar mounted upon the carriage for retaining a passenger therein, said bar being movable to a position permitting the passenger to enter or leave the carriage, and means rendered operable upon the safety bar being moved to the last mentioned position for holding the inner and outer rings against relative movement.

5. In apparatus of the class described, a ring mounted for rotation about a substantially horizontal axis, a carriage supported on rollers for rotation substantially concentrically within said ring, means for rotating said ring, clutch means tending to hold the carriage to the ring for rotation therewith, a control member in said carriage operable by a passenger therein for rendering said clutch means effective, a safety bar mounted upon the carriage for retaining a passenger therein, said bar being movable to a position permitting the passenger to enter or leave the carriage, and means connecting the safety bar and clutch means for rendering the latter effective when the safety bar is moved to said last mentioned position.

6. In apparatus of the class described, a carriage supported for rotation about a substantially horizontal axis, seating means for a passenger arranged in and movable with said carriage and including a pair of facing chairs, means for applying turning moments to the carriage for causing the same to rotate about said substantially horizontal axis, said means for applying turning moments including a control element disposed in said carriage between said opposed chairs whereby a passenger in either of the latter may apply the turning moments.

7. In apparatus of the class described, a member rotatable about a substantially horizontal axis and means for driving said member, a passenger carriage adapted for rotation coaxially of said member, a safety bar mounted upon the carriage for retaining a passenger therein, said bar being movable to a position permitting the passenger to enter or leave the carriage, and means rendered operable upon the safety bar being moved to the last mentioned position for holding the carriage against rotation relative to said member.

8. In amusement apparatus, a member rotatable about a substantially horizontal axis and drive means therefor, a passenger carriage mounted for rotation substantially coaxially of said member and provided with facing chairs, a control member mounted in said carriage between said chairs and movable in opposite directions by an occupant, and a clutch for connecting the carriage to the rotatable member and actuated upon movement of the control member in either of said opposite directions.

NORMAN BARTLETT.